(12) United States Patent
Schmidt et al.

(10) Patent No.: US 6,293,679 B1
(45) Date of Patent: Sep. 25, 2001

(54) EXTENDED FIELD OF VIEW MIRROR

(76) Inventors: William P. Schmidt, 21000 Woodruff Rd., Rockwood, MI (US) 48173; Franklin D. Hutchinson, 28000 Beel Rd., New Boston, MI (US) 48164

( * ) Notice: Subject to any disclaimer, the term of this patent is extended or adjusted under 35 U.S.C. 154(b) by 0 days.

(21) Appl. No.: 07/942,293

(22) Filed: Sep. 9, 1992

(51) Int. Cl.[7] .............................. G02B 5/08; G02B 7/182; G02B 27/00; B60R 1/06
(52) U.S. Cl. .................. 359/603; 359/604; 359/614; 359/838; 359/868; 359/871; 359/872
(58) Field of Search ...................... 359/601, 602, 359/603, 604, 614, 838, 868, 871, 872, 881

(56) References Cited

U.S. PATENT DOCUMENTS

| | | | |
|---|---|---|---|
| 1,811,823 | * | 6/1931 | Horton ................................. 359/603 |
| 3,901,587 | * | 8/1975 | Haile ................................... 359/872 |
| 4,023,029 | * | 5/1977 | Fischer ................................ 359/838 |
| 4,436,372 | * | 3/1984 | Schmidt et al. ..................... 359/868 |
| 4,730,914 | | 3/1988 | Stout . |
| 4,938,578 | | 7/1990 | Schmidt et al. . |
| 5,084,785 | * | 1/1992 | Albers et al. ........................ 359/871 |
| 5,589,984 | * | 12/1996 | Schmidt et al. ..................... 359/872 |

* cited by examiner

*Primary Examiner*—Ricky D. Shafer

(57) ABSTRACT

A vehicle or other type mirror having a convex reflective surface is surrounded by an opaque or non-reflective band. The opaque band extends from the reflective surface to a mounting flange. The mounting flange is adapted to seat on a mounting frame. A gasket secures the mounting frame and the mounting flange together. The mirror is mounted to a vehicle by suitable mounting members. The mirror permits the entire reflective surface to be available for viewing without interference from the gasket or mounting frame.

7 Claims, 1 Drawing Sheet

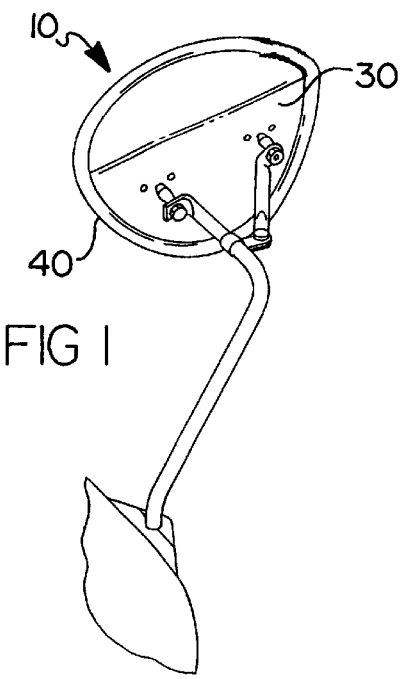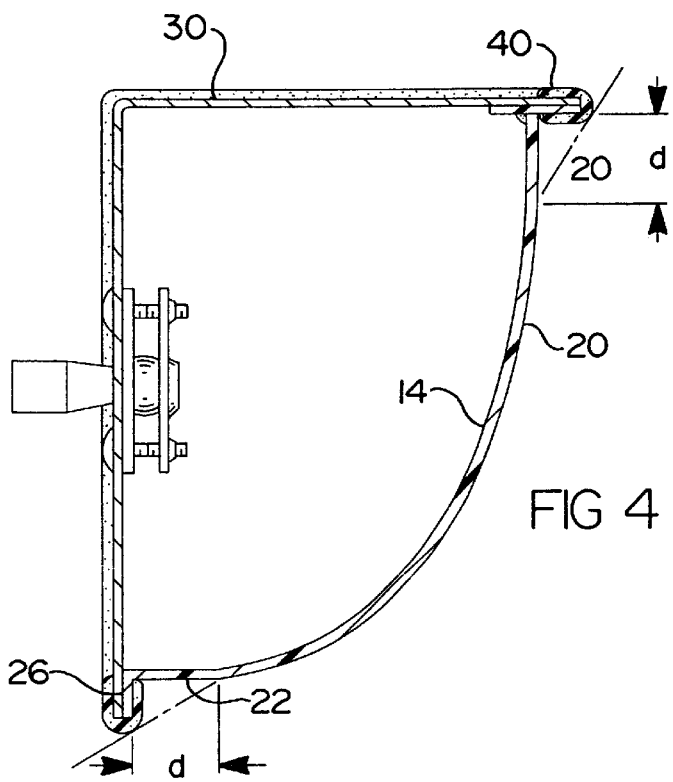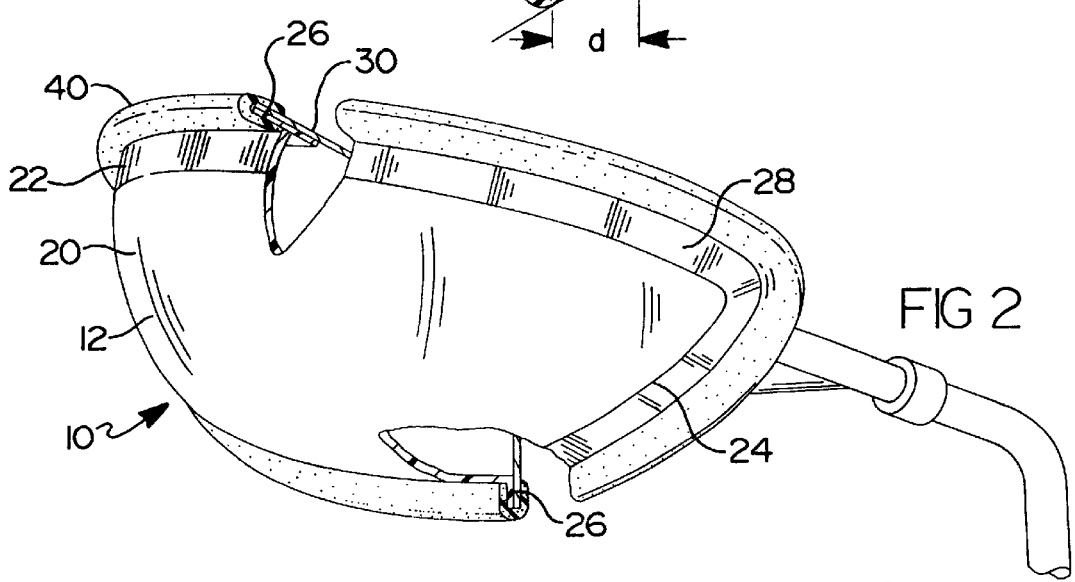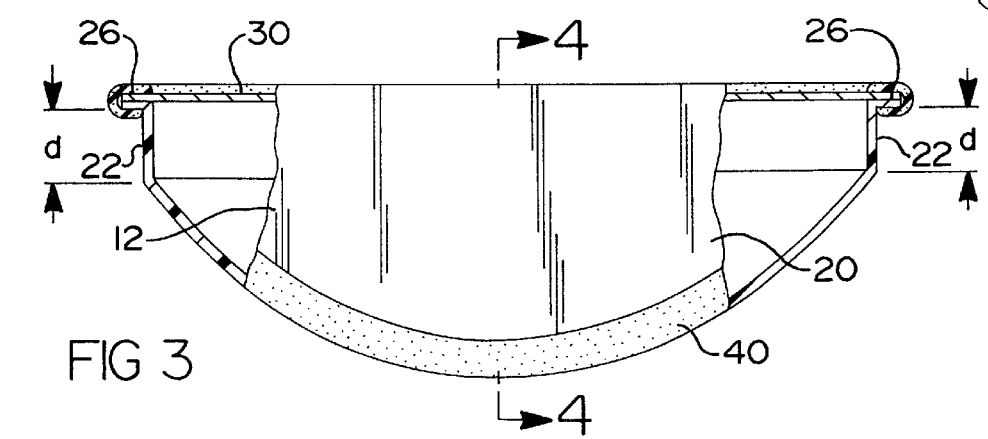

EXTENDED FIELD OF VIEW MIRROR

BACKGROUND OF THE INVENTION

1. Field of the Invention

The present invention relates to a vehicular mirrors. More particularly, the present invention relates to large field-of-view vehicular mirrors. Even more particularly, the present invention concerns mirrors having a convex surface with an extended or uninterrupted field-of-vision.

2. Background of the Art

There have been substantial improvements in recent years in both vehicular mirrors, security mirrors and other convex type mirrors that have extended the field-of-view or vision for the user or operator of the vehicle.

For example, U.S. Pat. No. 4,730,914 to Stout, et al., teaches an extended field of view mirror having a convex surface which is spherical, but which is ten inches in diameter. This mirror is commonly referred to as a "banana" mirror because of its shape. Due to its exterior width, though the mirror does have inherent disadvantages.

U.S. Pat. No. 4,938,578 to Schmidt, et al., the disclosure of which is hereby incorporated by reference, discloses an ellipsoidal convex surface vehicle mirror which is truncated to reduce the surface area of the mirror, but not the field-of-vision.

Each of the above mirrors, although substantially increasing the field-of-vision for the vehicle operator, still has a portion of the mirror that does not contribute to their respective viewing surfaces.

As is known to those skilled in the art, each of the prior art mirrors has a mirror frame or mounting gasket positioned at the edge or over the edge of the mirror. This gasket secures the mirror to a mounting frame. However, the gasket and the frame extend far enough into the reflecting area of the mirror so as to block the use of the surface of the mirror near the edge, except to reflect the gasket and the frame. This creates a blind spot in the field-of-vision for the operator.

To make this additional mirror surface available for use by a vehicle operator would greatly add to the safe operation of a vehicle. In the case of school buses, this additional mirror surface would greatly add to the safety of the children in and around the buses. It is to this to which the present invention is directed.

SUMMARY OF THE INVENTION

The present invention provides for an extended field-of-view mirror which is preferably positioned on each of the front fenders of a vehicle. Although, generally used on school buses, the mirror can be readily adapted for use on any large vehicle, including, but not limited to, recreational vehicles, trucks, boats, aircraft, and the like. Likewise, the present invention is equally applicable to any other type of convex mirror.

The extended field-of-view mirror of the present invention generally comprises:
  (a) a convex reflective surface having a viewing area and a continuous perimetral edge surrounding the viewing area and lying in a plane
  (b) an opaque band integrally formed with the reflective surface and depending from the perimetral edge substantially to the plane the opaque band substantially surrounding the entire reflective surface; and
  (c) a mounting flange integrally formed with and substantially opaque band, normally formed to the and extending outwardly therefrom.

As noted, the extended field-of-view mirror lens is preferably a convex reflective surface which may be ellipsoidal, spherical, rectangular or the like.

The opaque band extends from the perimeter of the field-of-view of the reflective surface, in lieu of the traditional edge of the mirror lens. The opaque or non-reflective band extends a sufficient distance from the perimetral edge of the reflective surface to position the mounting flange of the mirror away from the reflective surface of the mirror.

The mounting flange, which seats upon a mounting frame, is integrally formed with the opaque band and outwardly extends normally therefrom.

The mounting frame facilitates the mounting of the mirror onto a vehicle. The mirror lens is secured to the mounting frame by any suitable means.

In use a gasket is removably mounted onto the flange to finish the mirror. The mounting flange and the gasket are not reflected by the reflective surface of the mirror lens. Moreover, the gasket does not block off any portion of the reflective surface.

For a more complete understanding of the present invention reference is made to the following detailed description and accompanying drawing. Throughout the following description and drawings, identical reference numbers refer to the same component throughout the several views, in which:

BRIEF DESCRIPTION OF THE DRAWINGS

FIG. 1 is a perspective view of a vehicle mirror and mounting device in accordance with the present invention;

FIG. 2 is perspective, partial cut-away view of the vehicle mirror hereof;

FIG. 3 is a cross-sectional view of the vehicle mirror; and

FIG. 4 is a cross-sectional view of the vehicle mirror hereof taken along line 4—4 of FIG. 3.

DETAILED DESCRIPTION OF THE INVENTION

The mirror of the present invention, as shown in FIGS. 1–4, is an extended field-of-view mirror 10. The extended field-of-view mirror 10 hereof comprises:
  (a) a reflective surface 20, the reflective surface having a continuous perimetral edge 24 surrounding the viewing area 12;
  (b) an opaque band 22 integrally formed with the reflective surface 20 and depending from the edge 24, the opaque band 22 surrounding substantially the entire reflective surface 20; and
  (c) a mounting flange 26 integrally formed with the opaque band 22 and outwardly extending therefrom.

The vehicle mirror 10 has a viewing area or surface 12 and a non-viewing area or rear surface 14. The reflective surface 20 is located within the viewing area 12 of the mirror 10. The reflective surface 20 of the mirror 10, is, preferably convex. The mirror 10 may have any shape, such as circular, rectangular, square, elliptical, triangular or trapezoidal, or the like, as well as that described in copending application Ser. No. 07/706,264 filed May 29, 1992, the disclosure of which is hereby incorporated by reference. The reflective surface 20 is designed to occupy essentially 100% of the desired usable viewing area 12 of the mirror 10. The reflective surface 20 extends to a continuous perimetral edge 24 which surrounds the reflective surface 20, thereby defining the usable viewing area 12.

The opaque or non-reflective band 22 is integrally formed with the reflective surface 20 of the mirror 10 proximate the perimetral edge 24. The opaque band 22 generally angularly extends from the perimetral edge 24 of the reflecting surface 20 to the mounting flange 26. The opaque band 22 has an opaque surface coating 28 deposited thereon. Preferably, the coating is a commercially available frosted-type coating. However, any other type of non-glare, non-reflective coating may be used herein.

The mounting flange 26 is integrally formed with the opaque band 22 and is substantially normal thereto. The mounting flange 26 may, optionally, have an opaque surface coating 28, but an opaque surface coating is not required. The mounting flange 26 is used to mount the vehicle mirror 10 to a mounting frame 30.

A mounting frame 30 may be used to support the vehicular mirror 10 during use. The shape of the mounting frame 30 is generally determined by the shape of the mirror 10.

Where used, the mirror 10 is fixedly secured to the mounting frame 30 by a gasket 40. The mounting flange 26 seats on and abuts the mounting frame 30. The gasket 40, which is substantially U-shaped in its cross-section, is disposed over the mounting flange 26 and the mounting frame 30. The gasket 40 essentially covers 100% of the mounting flange 26. An adhesive may be employed to further enhance adhesion between the frame 30 and the flange 26.

The vehicle mirror 10 may be mounted to a vehicle 50 by any suitable mounting means (not shown), such as that disclosed in U.S. Pat. No. 4,500,063, entitled "Fender Mount for Mirror", by W. P. Schmidt and F. D. Hutchinson; U.S. Pat. No. 5,106,049, entitled "Vehicle Mounting Assembly", and U.S. Pat. No. 5,116,013, entitled "Mounting Mechanism", as well as that disclosed in the aforesaid U.S. patent application Ser. No. 07/706,264, the disclosures of which are hereby incorporated by reference.

In the drawing, the mounting means disclosed in the aforesaid U.S. patent application Ser. No. 07/706,264 is employed.

In accordance therewith suitable bracketry is secured to the frame 30 which is, then, in turn, used to interconnect the mirror to the vehicle.

Furthermore, it should be noted that the present invention is applicable to all types of convex mirrors, not just vehicular convex mirrors for increasing the filed-of-view.

While the mirror 10 has been described in conjunction with the exterior of a school bus and other vehicular environment, other types of convex mirrors, such as security mirrors and the like are amenable to the present invention.

Having, thus, described the present invention, what is claimed is:

1. An extended field-of-view mirror, the mirror comprising:

(a) a convex reflective surface having a viewing area and a continuous perimetral edge surrounding the viewing area;

(b) an opaque band integrally formed with the reflective surface and depending from the perimetral edge substantially normal to the plane the opaque band substantially surrounding the entire reflective surface; and (c) a mounting flange integrally formed with and disposed substantially normal to the opaque band and extending outwardly therefrom.

2. The mirror of claim 1, wherein the reflective surface comprises substantially all of the viewing area of the mirror, the viewing area being defined by the edge surrounding the reflective surface.

3. The mirror of claim 2, wherein the opaque band extends from the edge of the reflective surface to the mounting flange.

4. The mirror of claim 1, further comprising an opaque surface coating disposed on the band.

5. The mirror surface of claim 4, wherein the opaque surface coating is a non-glare, non-reflective coating.

6. The mirror of claim 1, further comprising:

(a) a mounting frame, the mounting frame supporting the mirror, the mounting flange of the mirror seating on the mounting frame, and (b) a gasket, the gasket mounted onto the mounting frame and the mounting flange, the gasket securing the flange to the mounting frame.

7. The mirror of claim 1, which further comprises:

means for mounting the mirror to the exterior of a vehicle.

* * * * *